United States Patent [19]
Hall

[11] Patent Number: 5,119,888
[45] Date of Patent: Jun. 9, 1992

[54] REPLACEABLE EDGE FOR TRENCHING PLOW BLADE

[76] Inventor: Ronald H. Hall, 161 Argyle Street, Embro, Ontario, Canada, N0J 1J0

[21] Appl. No.: 647,361

[22] Filed: Jan. 29, 1991

[51] Int. Cl.⁵ .............................................. A01B 13/08
[52] U.S. Cl. .................................. 172/699; 172/719; 172/745; 172/772.5
[58] Field of Search ........... 172/719, 745, 772, 772.5, 172/699, 725; 37/141 R; 405/174, 180

[56] References Cited

U.S. PATENT DOCUMENTS

| | | | |
|---|---|---|---|
| 3,268,012 | 8/1966 | Ratkowski | 172/700 |
| 3,777,500 | 12/1973 | Kelley | 405/180 |
| 4,142,817 | 3/1979 | Lazure | 405/174 |
| 4,155,665 | 5/1979 | Kaarlela | 172/772 X |
| 4,799,823 | 1/1989 | Williams | 172/719 X |
| 4,932,478 | 6/1990 | Jones | 172/699 |

FOREIGN PATENT DOCUMENTS

| | | | |
|---|---|---|---|
| 2124461 | 2/1984 | United Kingdom | 172/699 |
| 2209651 | 5/1989 | United Kingdom | 172/699 |

*Primary Examiner*—Randolph A. Reese
*Assistant Examiner*—Jeffrey L. Thompson
*Attorney, Agent, or Firm*—R. Craig Armstrong

[57] ABSTRACT

A trenching plow blade having replaceable wear components is disclosed. A preferably octagonal rod with regularly spaced transverse holes drilled therethrough is welded to the leading edge of the blade. Replaceable leading edge cover pieces each have a channel therein with a shape complementary to the front face of the rod, and transverse holes adapted to align with the transverse holes in the rod. Pins are positioned through the holes to hold the covers in place. Preferably, straight and curved sections of the covers are provided as required. For the toe of the blade, a toe cover is preferably provided. The rod and covers may be supplied as a kit, which is readily installed since the only operation required is welding.

4 Claims, 4 Drawing Sheets

REPLACEABLE EDGE FOR TRENCHING PLOW BLADE

BACKGROUND OF THE INVENTION

This invention relates to trenching plow blades, and particularly to a replaceable leading edge for such a blade.

A conventional trenching blade 1 can be seen in accompanying FIG. 2. It consists of a steel plate 2, typically either two or three inches thick, produced in the form of a blade having a generally vertical leading edge 3 and a toe portion 4 projecting forwardly therefrom. The lower half or so of the blade, depending on the desired trench depth, is forced forwardly through the ground, i.e. leading edge first, in a substantially vertical orientation, as shown.

Since it is the leading edge and toe which incur most of the wear when the blade is forced through the ground, it is obviously advantageous to provide a replaceable leading edge and toe, so that these can be treated as wear parts and replaced as required, rather than having to replace the entire blade when excessive wear has taken place. However, on the market at present there is no entirely satisfactory blade with such replaceable components, nor any entirely satisfactory kit for equipping existing blades with these replaceable wear parts. Existing arrangements require either a special blade, i.e. they cannot be retrofitted to conventional blades, or they require complex modifications to the blades for installation.

There is thus a need for a blade with conveniently replaceable components, and for a corresponding kit which can be readily adapted to conventional blades to provide for such replacement of components.

SUMMARY OF THE INVENTION

In the invention, the leading edge of the blade has a preferably octagonal rod welded to the front face thereof, with regularly spaced transverse holes drilled therethrough. A replaceable leading edge cover has a channel therein with a shape complementary to the front face of the rod, and transverse holes adapted to align with the transverse holes in the rod. Pins are positioned through the holes to hold the covers in place. Preferably, straight and curved sections of the covers are provided as required. Obviously, shapes other than octagonal could be readily envisioned, although octagonal is most effective.

For the toe of the blade, a toe cover is preferably provided.

The rod and covers may be supplied as a kit, which is readily installed since the only essential operation required is welding, i.e. there is no machining required, apart from some minor grinding which may or may not be necessary depending on the neatness of the welds.

BRIEF DESCRIPTION OF THE DRAWINGS

The preferred embodiment of the invention will now be described in greater detail by way of example only, with reference to the accompanying drawings, in which.

DETAILED DESCRIPTION OF THE PREFERRED EMBODIMENT

Figure 1:
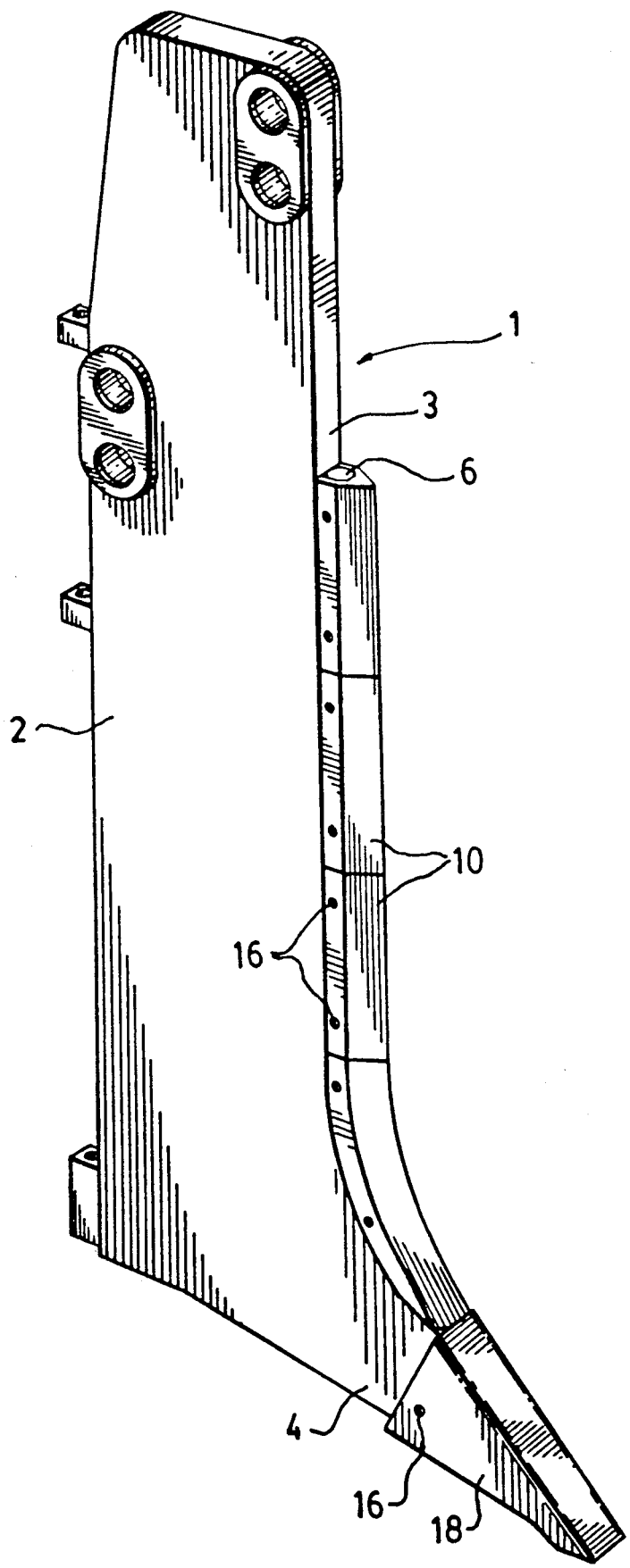
FIG. 1 is a perspective of the trenching blade, with the replaceable components installed.

The leading edge 3 of the blade has an octagonal rod 6 welded to the front face thereof, with regularly spaced transverse holes 8 drilled therethrough. Replaceable leading edge cover pieces 10 have a channel 12 therein with a shape complementary to the front face of the octagonal rod, and transverse holes 14 adapted to align with the transverse holes in the octagonal rod. Pins 16 are positioned through the holes to hold the covers in place.

Figure 2:
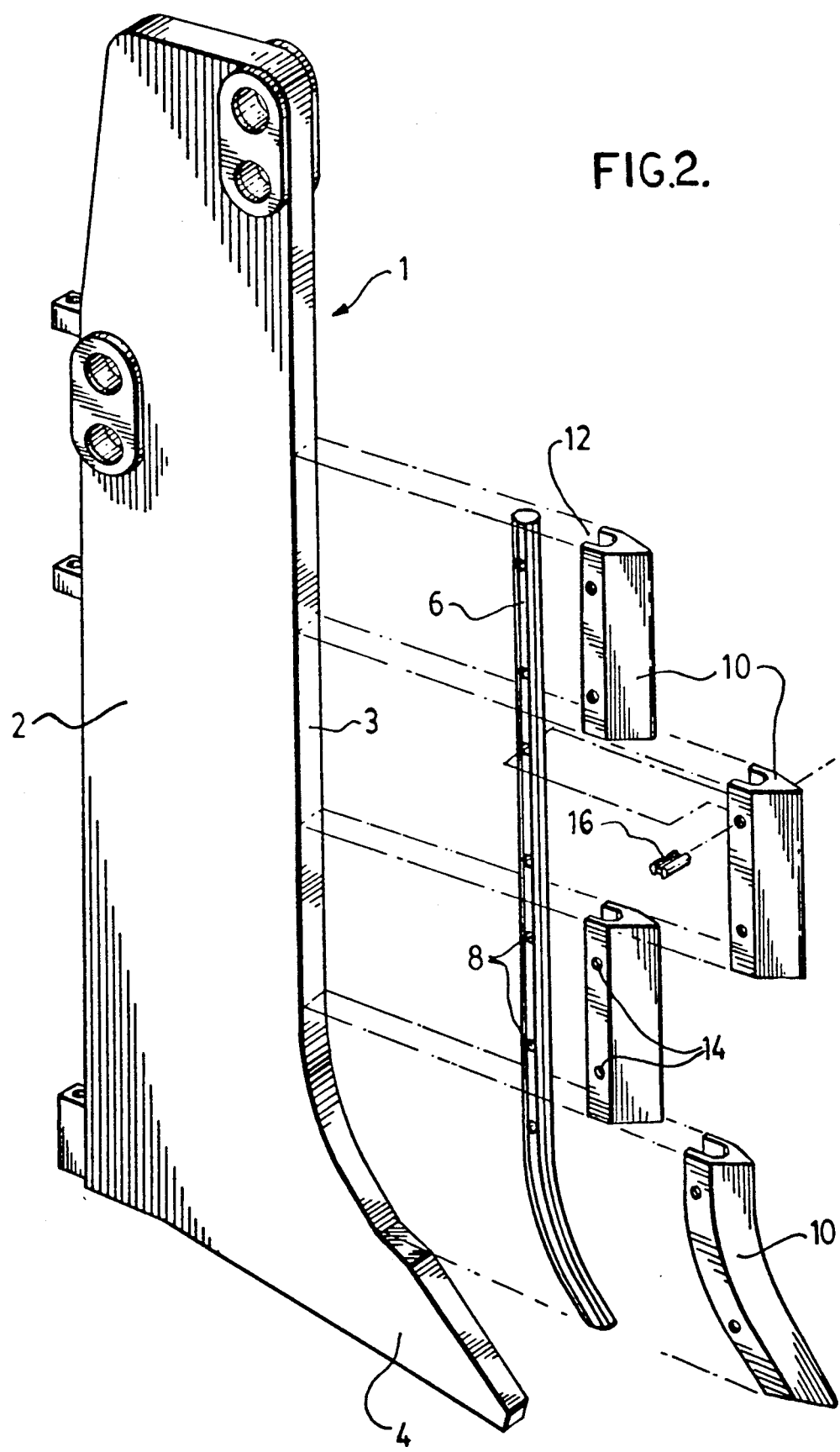
FIG. 2 is an exploded perspective of the trenching blade, corresponding to FIG. 1.
Figure 3:
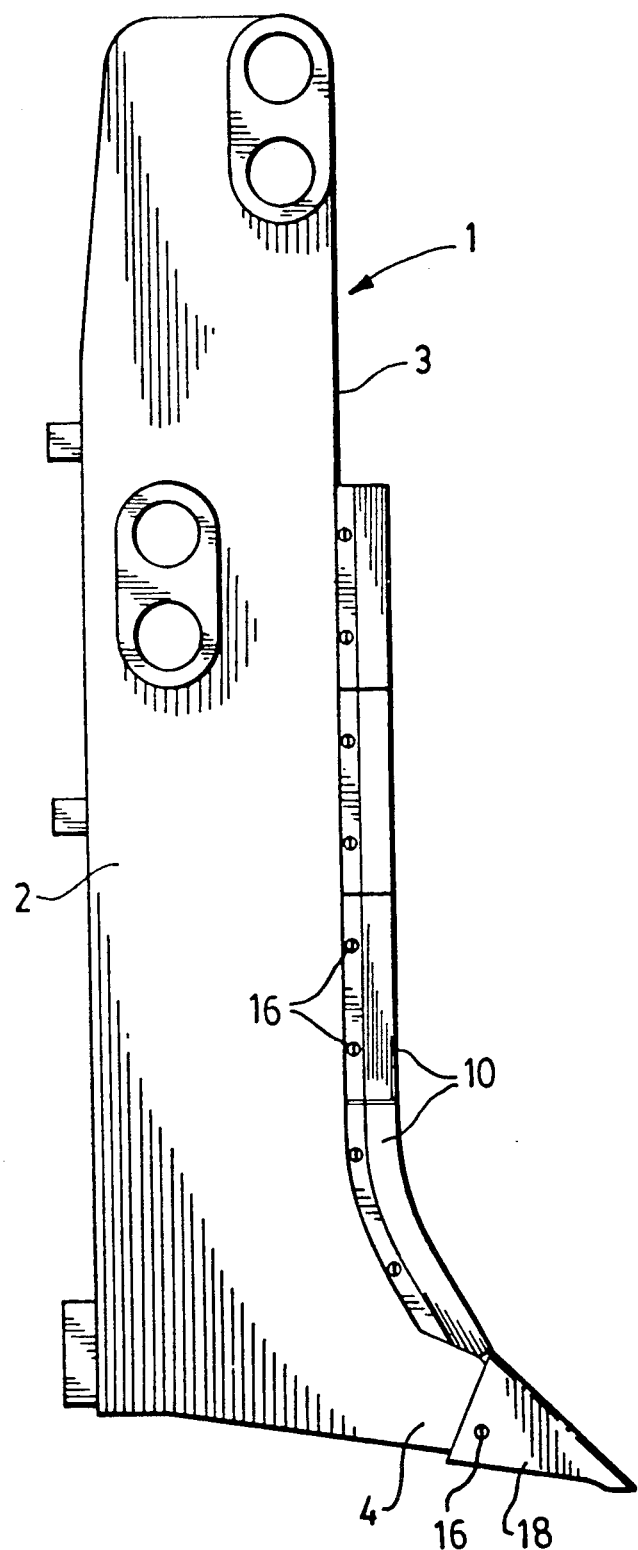
FIG. 3 is a corresponding side elevation view of the blade.

Preferably, separate straight and curved sections of the covers are provided as required, so that they can be replaced separately. The straight vertical sections will receive more wear than the curved ones. In the preferred embodiment, as illustrated in FIG. 2, there are three straight sections and one curved section. For retrofitting of blades in the field, the rod is preferably supplied pre-bent and pre-drilled.

For the toe of the blade, a toe cover 18 is provided (not shown in FIG. 2), which simply fits over the toe, having an internal shape corresponding to the shape of the toe, and is held in place by another pin 16.

The pins 16 preferably are of the self-locking type, by virtue of having two steel segments 19 bonded to and separated by a compressible rubber block 20. Once installed, the pins stay in place primarily by virtue of the action of the rubber block, but also by virtue of the fact that in using the blade, the earth would contact any pin which started to come out and would tend to force it back in. The pins are thus both self-locking and in a sense self-centering.

Figure 4:
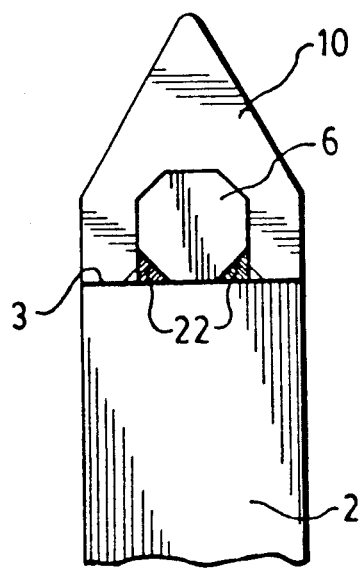
FIG. 4 is a top view of the leading edge area of a two-inch wide blade.
Figure 5:
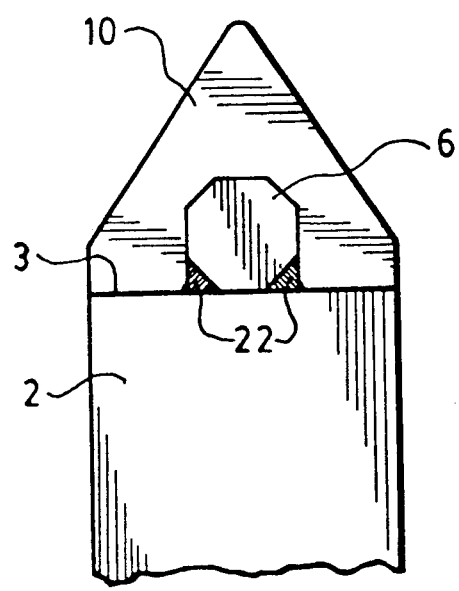
FIG. 5 is a top view of the leading edge area of a three-inch wide blade.
Figure 6:
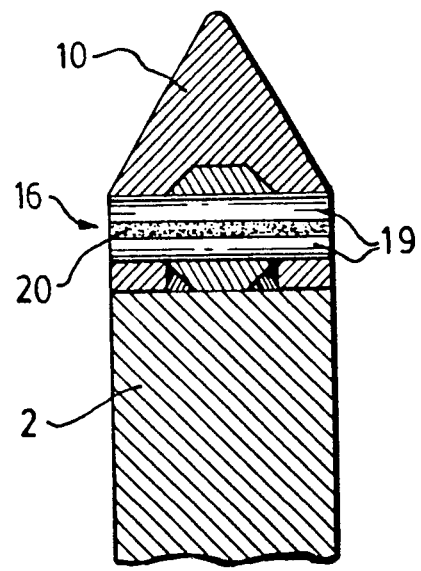
FIG. 6 is a top view, in cross-section, of the leading edge area through one of the pins which holds the covers in place.
Figure 7:
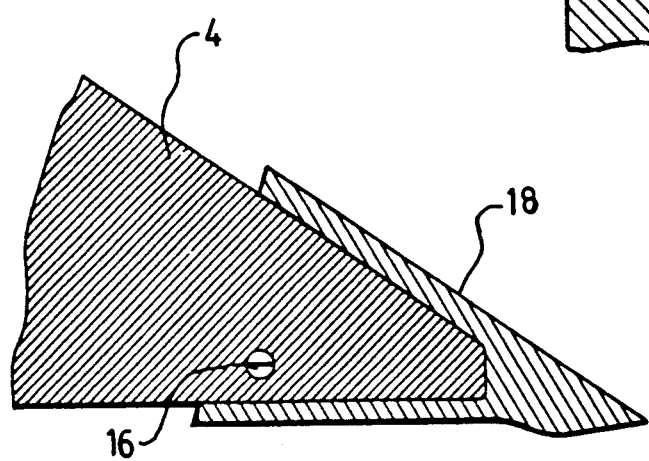
FIG. 7 is a side cross-section of the area of the toe of the blade.

It will be appreciated that rod shapes other than octagonal may be used, with the shape of the channel in the leading edge cover being adapted to suit the shape of the rod. The octagonal shape is particularly advantageous, however, since the rod is readily available for purchase as a standard item, and since it provides for secure anchoring of the leading edge cover as well as providing space for welding the rod to the leading edge of the blade. That is, as can be seen in FIGS. 4 and 5, the octagonal shape provides for space for the welds 22 without interfering with the channel 12, although some grinding may be required after welding to ensure that the weld does not project into the channel space.

What is claimed as the invention is:

1. A trenching plow blade having replaceable components, comprising:

a blade having a leading edge, said leading edge having a rod of octagonal cross-section welded to the front face thereof, with regularly spaced transverse holes drilled therethrough;

one or more replaceable leading edge cover sections each having a channel therein with a shape complementary to the octagonal shape of said rod, and transverse holes adapted to align with said transverse holes in said rod; and pins positionable through said holes in said cover sections and said rod, to hold said cover sections in place.

2. A trenching plow blade as recited in claim 1, further comprising a toe cover adapted to fit over the toe of the blade and having an internal shape complementary to the external shape of the toe of the blade, said blade and said toe cover each being provided with at least one transverse hole therethrough for receiving a pin to hold said toe cover in place.

3. A kit to provide a trenching plow blade with replaceable wear components, said kit comprising:

a rod of octagonal cross-section adapted to be welded along the front face of said trenching plow blade, with regularly spaced transverse holes drilled therethrough;

one or more replaceable leading edge cover sections each having a channel therein with a shape complementary to the front face of said rod, and transverse holes adapted to align with said transverse holes in said rod; and pins positionable through said holes in said cover sections and in said rod, to hold said cover sections in place.

4. A kit as recited in claim 3, further comprising a toe cover adapted to fit over the toe of the blade and having an internal shape complementary to the external shape of the toe of the blade, said toe cover being provided with at least one transverse hole therethrough for receiving a pin to pass therethrough and through a hole to be drilled in said toe of said blade, to hold said toe cover in place.

* * * * *